(12) United States Patent
Liu

(10) Patent No.: US 11,925,293 B2
(45) Date of Patent: Mar. 12, 2024

(54) STOVE WITH A HEIGHT-ADJUSTABLE GRILL GRATE

(71) Applicant: Chia-Ming Liu, Douliou (TW)

(72) Inventor: Chia-Ming Liu, Douliou (TW)

( * ) Notice: Subject to any disclaimer, the term of this patent is extended or adjusted under 35 U.S.C. 154(b) by 919 days.

(21) Appl. No.: 16/921,439

(22) Filed: Jul. 6, 2020

(65) Prior Publication Data

US 2020/0329910 A1 Oct. 22, 2020

Related U.S. Application Data

(63) Continuation-in-part of application No. 15/682,815, filed on Aug. 22, 2017, now abandoned.

(30) Foreign Application Priority Data

May 27, 2017 (CN) .......................... 201720606844.X

(51) Int. Cl.
*A47J 37/07* (2006.01)
(52) U.S. Cl.
CPC ....... *A47J 37/0731* (2013.01); *A47J 37/0704* (2013.01); *A47J 37/0786* (2013.01)

(58) Field of Classification Search
CPC ................ A47J 37/0731; A47J 37/0704; A47J 37/0786; A47J 37/0795; A47J 37/079; A47J 37/0713; A47J 37/04
See application file for complete search history.

(56) References Cited

U.S. PATENT DOCUMENTS

| 4,926,838 A * | 5/1990 | Sells ...................... A47J 37/041 99/393 |
| 5,429,043 A * | 7/1995 | Becker .................... F24C 15/16 99/450 |
| 2012/0266856 A1* | 10/2012 | Zelek .................... A47J 37/067 126/25 R |

* cited by examiner

*Primary Examiner* — Brian W Jennison
(74) *Attorney, Agent, or Firm* — Burris Law, PLLC

(57) ABSTRACT

A stove includes a heating unit, an adjustment unit and a grill grate. The adjustment unit includes two lifting units, a synchronizer, and a drive unit. Each lifting unit has a screw rod, a sliding block movable along the screw rod, and a lift frame mounted to the sliding block. The synchronizer connects the lifting units. The drive unit is connected to the screw rod of one of the lifting units and is operable to drive synchronized rotation of the screw rods through the synchronizer. The grill grate is supported by the lift frames for moving between a first position, where the grill grate is proximate to the heating unit, and a second position, where the grill grate is distal from the heating unit.

6 Claims, 8 Drawing Sheets

STOVE WITH A HEIGHT-ADJUSTABLE GRILL GRATE

CROSS-REFERENCE TO RELATED APPLICATION

This application is a continuation-in-part (CIP) of copending U.S. patent application Ser. No. 15/682,815, filed on Aug. 22, 2017, which claims priority of Chinese Patent Application No. 201720606844.X, filed on May 27, 2017.

FIELD

The disclosure relates to a stove and more particularly to a stove with a height-adjustable grill grate.

BACKGROUND

Generally, when using a conventional stove for grilling, a food material is placed on a grill grate of the conventional stove, and a heating source (such as burned charcoal, a gas heater, or an infrared heater) is disposed at a bottom portion of a main body of the conventional stove under the grill grate for heating the food material.

However, since a distance between the heating source and the grill grate is fixed, when using charcoal as the heating source (which implies that the magnitude and uniformity of heating are not conveniently adjustable), the food material may be cooked unevenly. Furthermore, the conventional stove is incapable of smoking the food material.

U.S. Pat. No. 4,926,838 disclosed a conventional outdoor grill for cooking food that has a grid surface connected to a bevel gear transmission which permits continuous adjustment over the entire height range of a grid frame. The bevel gear transmission is remote from the grid surface, thereby permitting adjustment without the direct danger of the operator suffering a burn injury. The grid surface is supported by two exposed drive shafts and four exposed stabilizer posts.

However, the exposed drive shafts and stabilizer posts are adverse to the outward appearance of the conventional outdoor grill, and may easily get rusty to disable the adjustment of the grid surface.

SUMMARY

Therefore, an object of the disclosure is to provide a stove that can alleviate at least one of the drawbacks associated with the abovementioned prior art.

Accordingly, the stove includes a base seat, a top seat, a heating unit, an adjustment unit and a grill grate. The base seat includes a seat body. The top seat is disposed on top of the seat body. The heating unit is disposed at bottom of the top seat. The adjustment unit includes two lifting units, a synchronizer, and a drive unit. The two lifting units are respectively disposed at two opposite sides of the top seat. Each of the lifting units has a screw rod, a sliding block that is engaged with and driven by the screw rod to move upward or downward therealong, and a lift frame that is mounted onto the sliding block for concurrent movement therewith. The synchronizer connects the two lifting units. The drive unit is connected to the screw rod of one of the lifting units, and is operable to drive synchronized rotation of the screw rods of the lifting units through the synchronizer, thereby moving the sliding blocks of the lifting units together with the lift frames of the lifting units along the screw rods. The grill grate is disposed above the heating unit and supported by the lift frames for moving between a first position, where the grill grate is proximate to the heating unit, and a second position, where the grill grate is distal from the heating unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
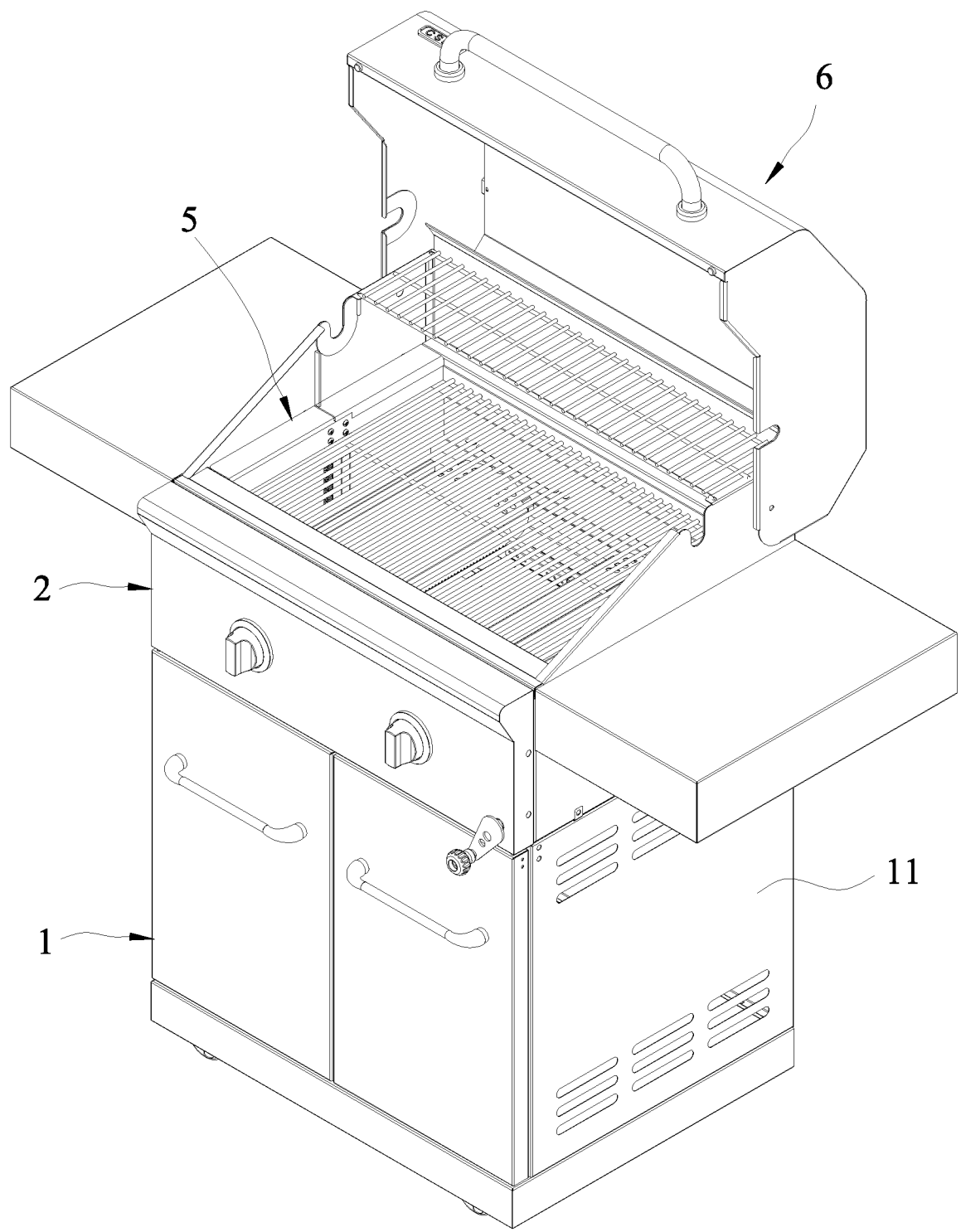
FIG. 1 is a perspective view of an embodiment of a stove according to the present disclosure.
Figure 2:
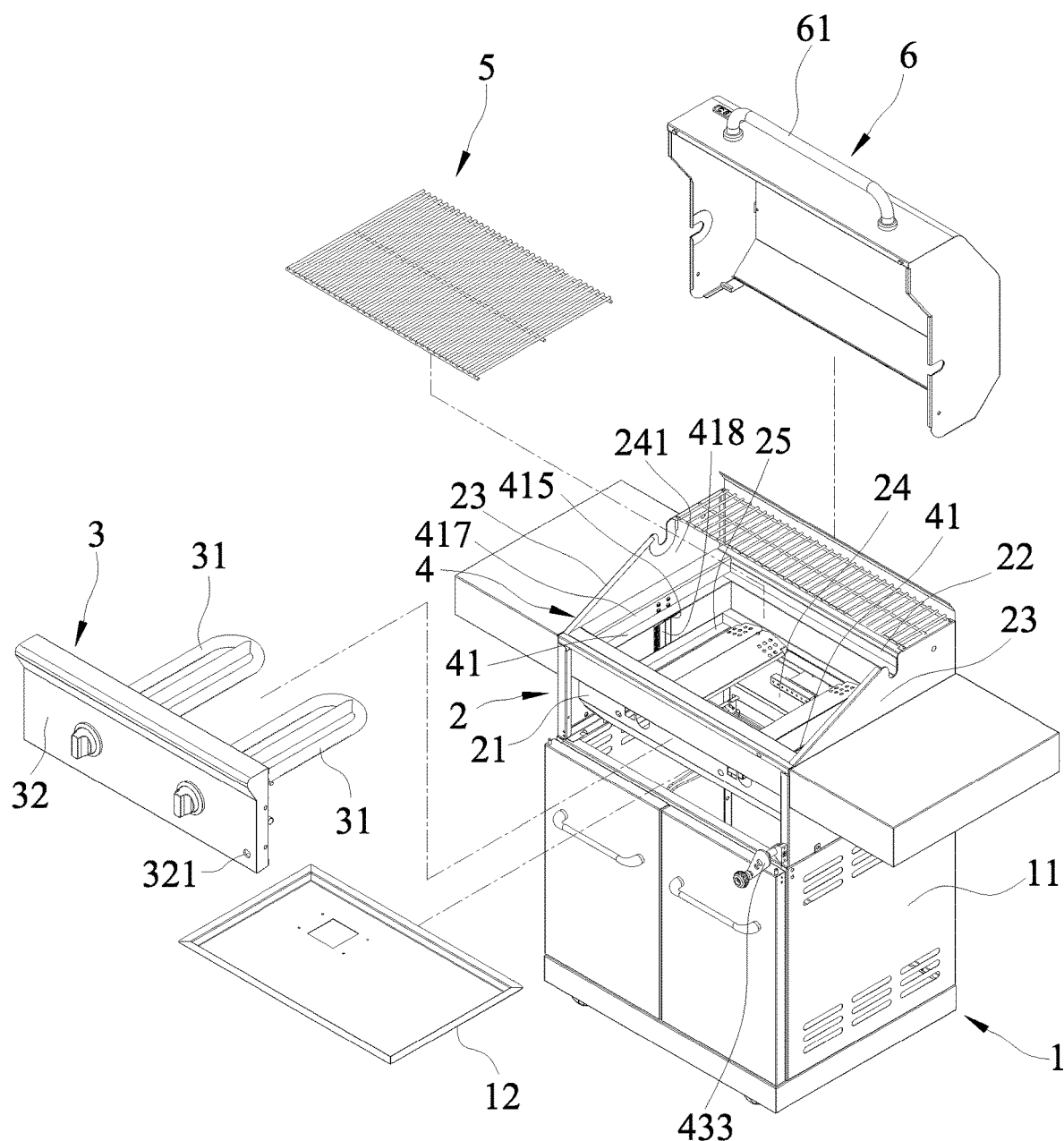
FIG. 2 is a partial exploded perspective view of the embodiment.
Figure 3:
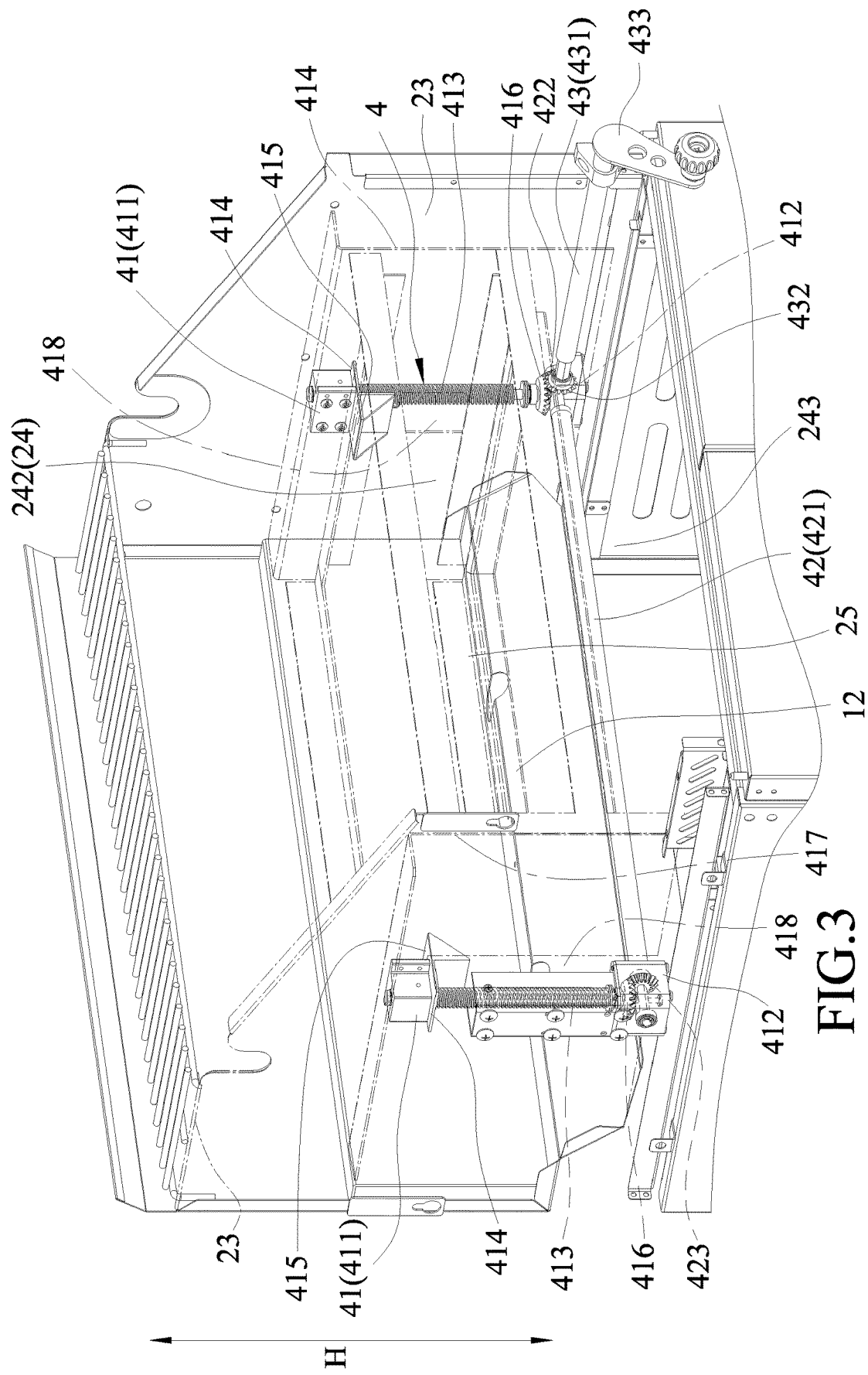
FIG. 3 is a fragmentary perspective view of the embodiment.

Referring to FIGS. 1 to 3, an embodiment of a stove according to the disclosure includes a base seat 1, a top seat 2, a heating unit 3, an adjustment unit 4, a grill grate 5, and a top cover 6.

The base seat 1 includes a seat body 11, and a drip pan 12 disposed on top of the seat body 11 and provided with a pan groove for catching material that drips from above, such as grease.

The top seat 2 has a front wall 21, a rear wall 22, and two opposite connecting walls 23 that are spaced apart from each other and connected between the front wall 21 and the rear wall 22. The front, rear and connecting walls 21, 22, 23 cooperatively bound a mounting space 24 that spatially communicates with the pan groove and that has an upper opening 241.

The top seat 2 further has a support rack 25 that permits the drip pan 12 to be disposed thereon, and that divides the mounting space 24 into an upper heating region 242 and a lower transmission region 243 located below the heating region 242.

The heating unit 3 is disposed at bottom of the top seat 2 and includes two heaters 31 that extend into the heating region 242 and that are located above the drip pan 12, and a heating seat 32 that supports the heaters 31. In this embodiment, each of the heaters 31 is configured as a gas pipe. The heating seat 32 has a through hole 321.

Figure 4:
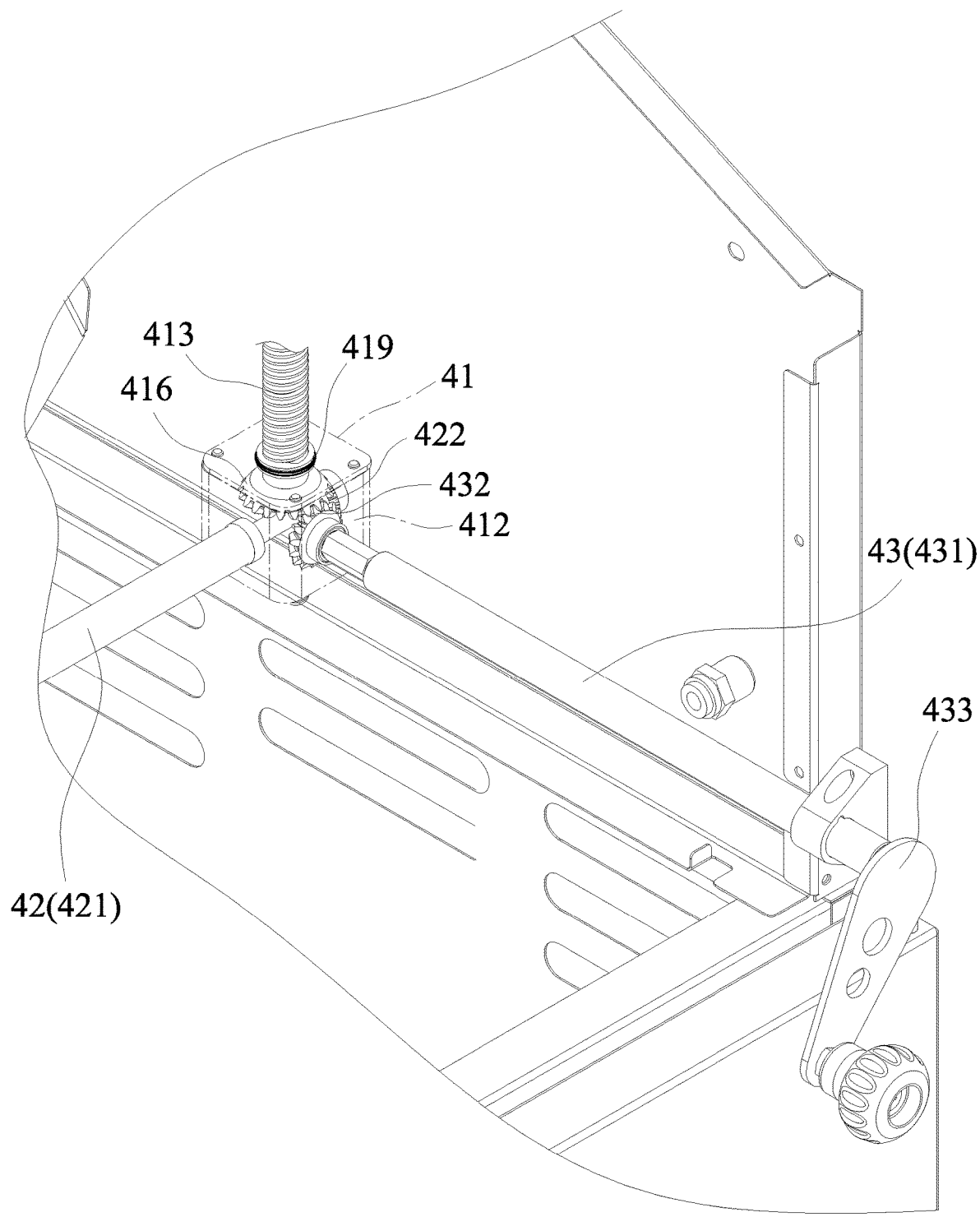
FIG. 4 is an enlarged view of FIG. 3.

Referring to FIGS. 2 to 4, the adjustment unit 4 includes two lifting units 41 respectively connected to the connecting walls 23 of the top seat 2, a synchronizer 42 connecting the two lifting units 41, and a drive unit 43 rotatably mounted on the top seat 2. Each of the lifting units 41 has a fixed frame 411 fixed onto the respective one of the connecting walls 23, a mounting seat 412 disposed below the fixed frame 411, a screw rod 413 extending in both of the heating region 242 and the transmission region 243 and rotatably mounted to the fixed frame 411, a sliding block 414 engaged with and driven by the screw rod 413 to move upward or downward therealong, a lift frame 415 mounted onto the sliding block 414 for concurrent movement therewith, a screw rod gear 416 disposed at a bottom end of the screw rod 413, a shield plate 417 corresponding to a respective one of the connecting walls 23 (disposed at inner side of the respective one of the connecting walls 23) and extending in both of the heating region 242 and the transmission region 243, and a through groove 418 formed through the shield plate 417 and corresponding in position to the screw rod 413. For each of the lifting units 41, the mounting seat 412 and the screw rod 413 are located between the shield plate 417 and the respective one of the connecting walls 23, and the lift frame 415 extends through the through groove 418 to one side of the shield plate 417 opposite to the respective one of the connecting walls 23. The synchronizer 42 is pivotally mounted to the mounting seats 412, connects the lifting units 41, and has a synchronizer bar 421 that is disposed in the transmission region 243, and a first synchronizer gear 422 and a second synchronizer gear 423, which are respectively disposed on two opposite ends of the synchronizer bar 421. The drive unit 43 has a drive shaft 431 located between the shield plate 417 of one of the lifting units 41 and the respective one of the connecting walls 23, a driving gear 432 disposed atone end of the drive shaft 431 and meshing with the first synchronizer gear 422, and a driving handle 433 disposed on the other end of the drive shaft 431 distal from the driving gear 432. The drive shaft 431 extends through the through hole 321 to be connected to the driving handle 433.

The screw rod gear 416 of one of the lifting units and the first synchronizer gear 422 of the synchronizer 42 simultaneously mesh with the driving gear 432 of the drive unit 43, and the second synchronizer gear 423 of the synchronizer 42 meshes with the screw rod gear 416 of the other one of the lifting units 41. In this embodiment, the screw rod gears 416, the synchronizer gears 422, 423, and the driving gear 432 are all bevel gears.

The driving gear 432 of the drive unit 43, the first synchronizer gear 422 and the screw rod gear 416 of the one of the lifting units 41 are disposed in the mounting seat 412 of the one of the lifting units 41. The second synchronizer gear 423 and the screw rod gear 416 of the other one of the lifting units 41 are disposed in the mounting seat 412 of the other one of the lifting units 41.

Figure 5:
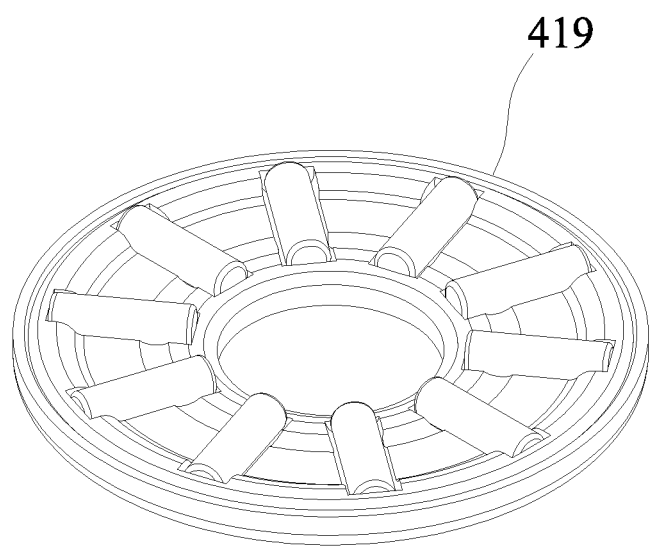
FIG. 5 is a perspective view of a thrust bearing of the embodiment.
Figure 6:
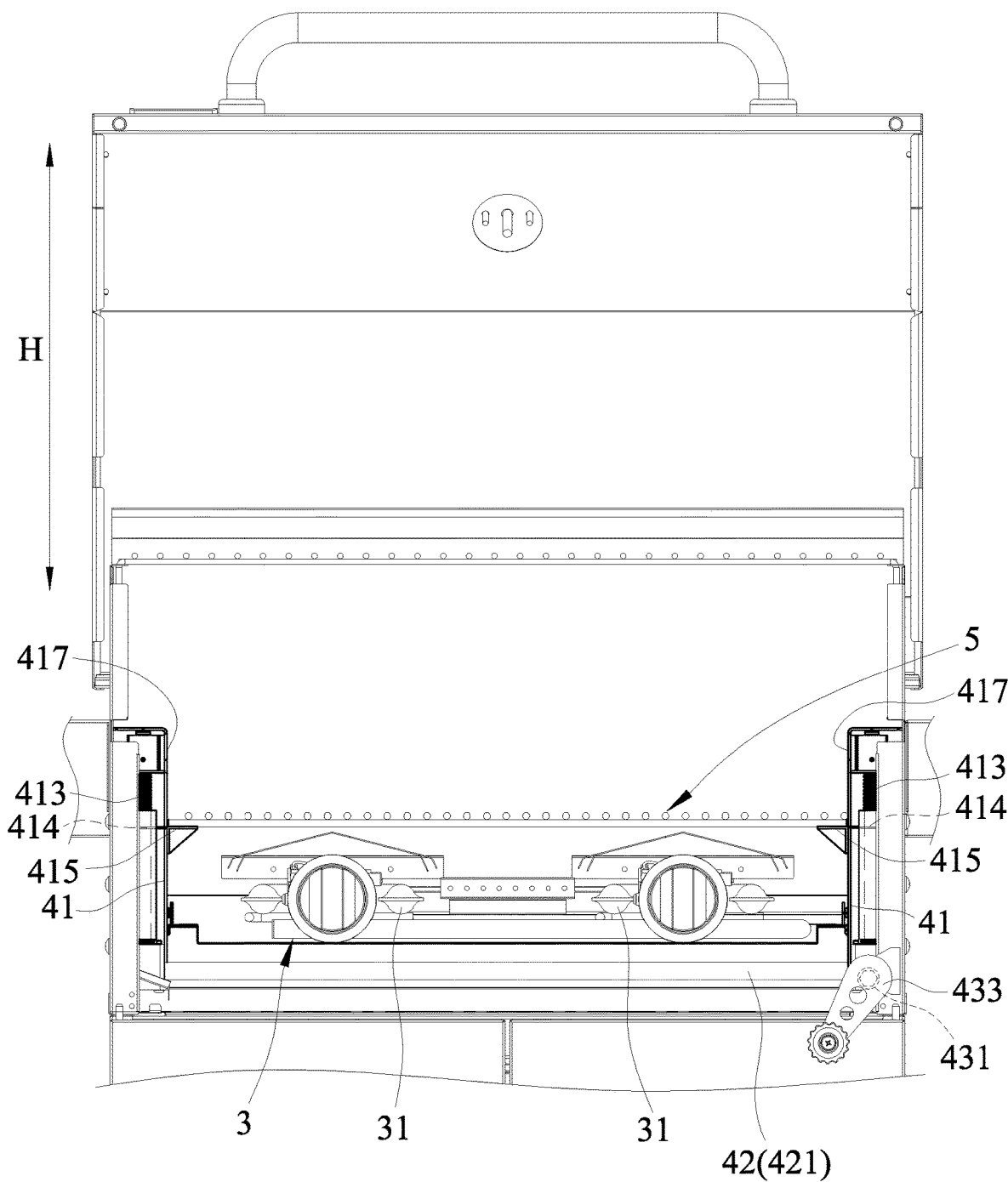
FIG. 6 is a fragmentary frontal view of the embodiment, illustrating a grill grate of the embodiment at a first position.
Figure 7:
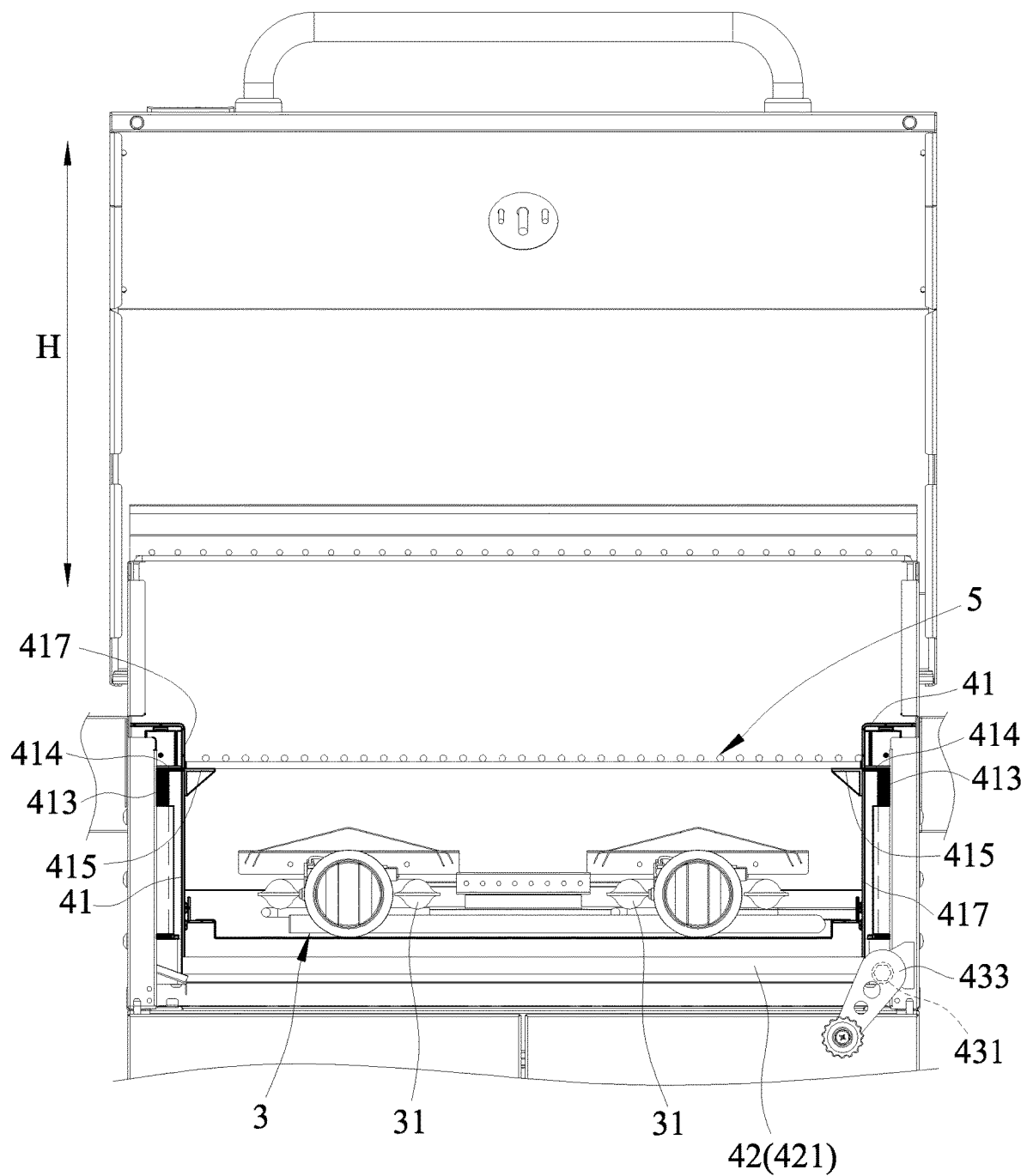
FIG. 7 is a view similar to FIG. 6, but illustrating the grill grate at a second position.

Referring to FIGS. 4 and 5, each of the lifting units 41 further includes a thrust bearing 419 disposed between the screw rod 413 and the mounting seat 412. The thrust bearing 419 serves to facilitate rotation of the screw rod 413 relative to the mounting seat 412.

Referring to FIGS. 3 through 7, the grill grate 5 is disposed above the heating unit 3, and can be removably mounted on top of the lift frames 415 of the lifting units 41. During the use of the stove, a user can rotate the driving handle 433 to drive the drive shaft 431 and to drive the rotation of the screw rod 413 of one of the lifting units 41 through the interconnecting relationship between the driving gear 432 and the screw rod gear 416 of the one of the lifting units 41. In addition, given that the driving gear 432 meshes with the first synchronizer gear 422, and taking advantage of the interconnecting relationship of the second synchronizer gear 423 with the screw rod gear 416 of the other one of the lifting units 41, the drive unit 43 is operable to drive synchronized rotation of the screw rods 413 of the lifting units 41 through the synchronizer 42, thereby moving the sliding blocks 414 together with the lift frames 415 along the screw rods 413. With this in mind, the grill grate 5 can be moved between a first position (see FIG. 6), where the grill grate 5 is proximate to the heating unit 3, and a second position (see FIG. 7), where the grill grate 5 is distal from the heating unit 3.

Since the synchronizer bar 421 is located in the transmission region 243, since the driving gear 432 of the drive unit 43, the first synchronizer gear 422 and the screw rod gear 416 of the one of the lifting units 41 are disposed in the mounting seat 412 of the one of the lifting units 41, and since the second synchronizer gear 423 and the screw rod gear 416 of the other one of the lifting units 41 are disposed in the mounting seat 412 of the other one of the lifting units 41, the drip pan 12 and the mounting seats 412 are capable of preventing the synchronizer bar 421, the driving gear 432, the first and second synchronizer gears 422, 423 and the screw rod gear 416 from being heated by the heaters 31 and from being contaminated by the grease, so as to lengthen the service lives of the synchronizer bar 421, the driving gear 432, the first and second synchronizer gears 422, 423 and the screw rod gear 416.

Since the mounting seat 412 and the screw rod 413 of each of the lifting units 41 are located between the shield plate 417 of the lifting unit 41 and the respective one of the connecting walls 23, and since the drive shaft 431 is located between the shield plate 417 of the one of the lifting units 41 and the respective one of the connecting walls 23, the components disposed in the mounting seat 412, the screw rods 413 and the the drive shaft 431 are prevented from being heated by the heaters 31 and from being contaminated by the grease by the shield plates 417 of the lifting units 41.

In addition, the mounting seats 412 prevent the driving gear 432, the first and second synchronizer gears 422, 423 and the screw rod gear 416 from being exposed, so the driving gear 432, the first and second synchronizer gears 422, 423 and the screw rod gear 416 are prevented from getting rusty and from being entangled with clothes, and the outward appearance of the stove is enhanced.

Figure 8:
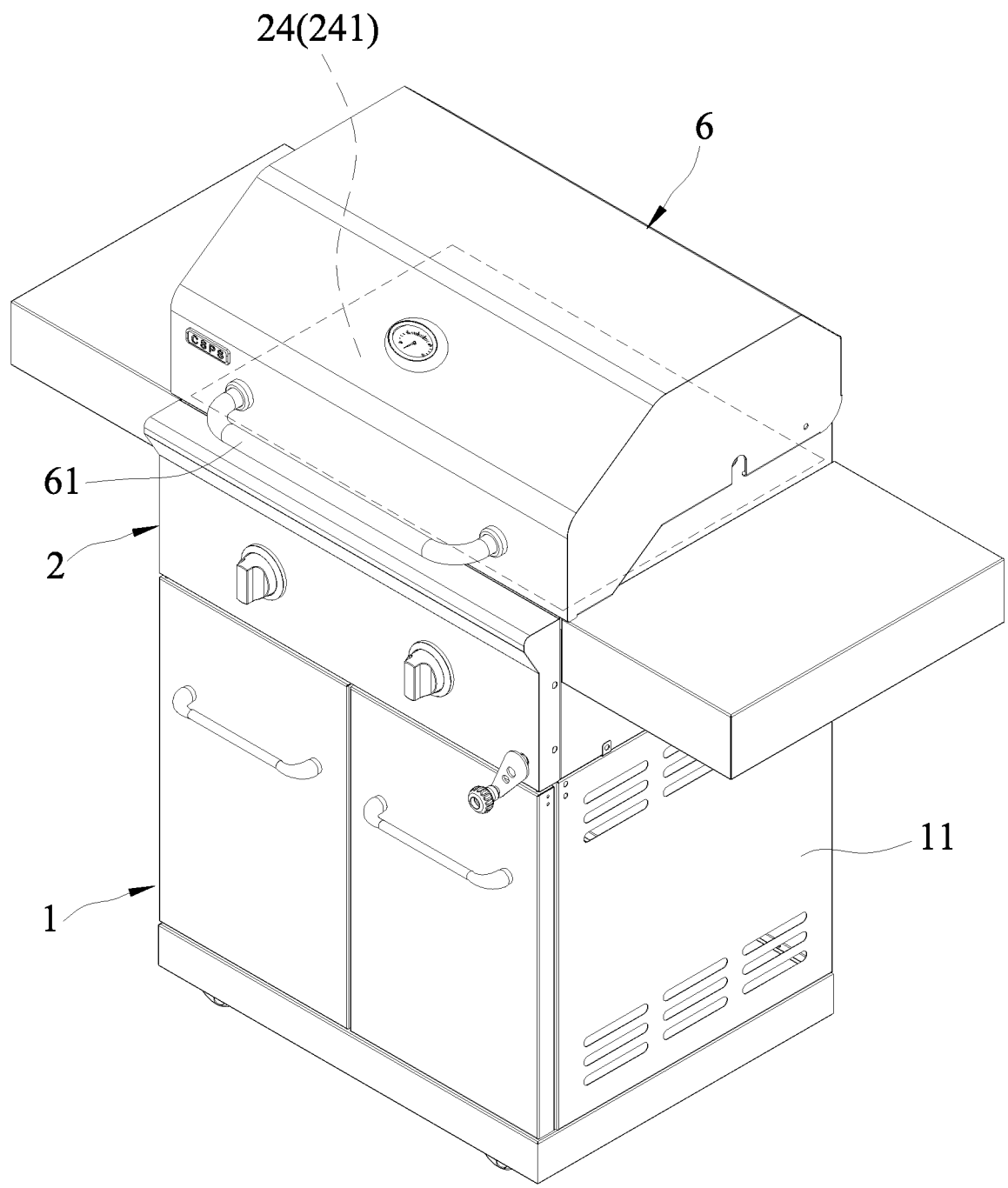
FIG. 8 is a view similar to FIG. 1, but illustrating a top cover at a covered position.

Referring to FIG. 8, the top cover 6 is pivotally connected to the top seat 2 and has a handle 61 that is operable to move the top cover 6 to open or close the mounting space 24. The user may choose to cover the opening 241 of the mounting space 24 such that a food material placed on the grill grate 5 can be smoked.

With the above description, the advantages of the stove according to the present disclosure can be summarized in the following:

1. The grill grate 5 can move between the first position and the second position, which allows for varying distance between the grill grate 5 and the heating unit 3, thereby allowing the user to better manage the grilling quality of the food material on the grill grate 5.
2. The drip pan 12 and the mounting seats 412 are capable of preventing the synchronizer bar 421, the driving gear 432, the first and second synchronizer gears 422, 423 and the screw rod gear 416 from being heated by the heaters 31 and from being contaminated by the grease, so as to lengthen the service lives of the synchronizer bar 421, the driving gear 432, the first and second synchronizer gears 422, 423 and the screw rod gear 416.
3. The mounting seats 412 prevent the driving gear 432, the first and second synchronizer gears 422, 423 and the screw rod gear 416 from being exposed, so the driving gear 432, the first and second synchronizer gears 422, 423 and the screw rod gear 416 are prevented from getting rusty and from being entangled with clothes, and the outward appearance of the stove is enhanced.

4. The the shield plates 417 of the lifting units 41 prevent the components disposed in the mounting seat 412, the screw rods 413 and the the drive shaft 431 from being contaminated by the grease by the shield plates 417 of the lifting units 41, so that service lives of the above-mentioned components are lengthened.

5. When the user moves the top cover 6 from a lifted position (see FIG. 1) to a covered position (see FIG. 8), the stove according to the present disclosure is capable of smoking the food material.

In the description above, for the purposes of explanation, numerous specific details have been set forth in order to provide a thorough understanding of the embodiment. It will be apparent, however, t one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A stove comprising:
a base seat including a seat body and a drip pan;
a top seat disposed on top of said seat body, said top seat having a front wall, a rear wall, and two connecting walls that are spaced apart from each other and connected between said front wall and said rear wall, said front, rear and connecting walls cooperatively bounding a mounting space, said top seat further having a support rack that permits said drip pan to be disposed thereon and that divides said mounting space into an upper heating region and a lower transmission region located below said upper heating region;
a heating unit including a heater that extends into said heating region and that is located above said drip pan, and a heating seat that supports said heater;
an adjustment unit including
   two lifting units respectively connected to said connecting walls of said top seat, each of said lifting units having
   a screw rod extending in both of said heating region and said transmission region, a sliding block engaged with and driven by said screw rod to move upward or downward therealong, and a lift frame mounted onto said sliding block for concurrent movement therewith,
a synchronizer connecting said two lifting units, and
a drive unit connected to said screw rod of one of said lifting units and operable to drive synchronized rotation of said screw rods of said lifting units through said synchronizer, thereby moving said sliding blocks of said lifting units together with said lift frames of said lifting units along said screw rods; and a grill grate disposed above said heating unit and supported by said lift frames for moving between a first position, where said grill grate is proximate to said heating unit, and a second position, where said grill grate is distal from said heating unit;
wherein each of said lifting units has a screw rod gear co-rotatably disposed at a bottom end of said screw rod, said synchronizer having a synchronizer bar disposed in said transmission region, and first and second synchronizer gears disposed on two opposite ends of said synchronizer bar;
wherein said drive unit has a drive shaft, and a driving gear disposed at one end of said drive shaft and meshing simultaneously with said first synchronizer gear and said screw rod gear of one of said lifting units, said second synchronizer gear meshing with said screw rod gear of the other one of said lifting units;
wherein said lifting units further have two fixed frames respectively fixed onto said connecting walls, and two mounting seats respectively disposed below said fixed frames, said screw rods of said lifting units being respectively mounted to said fixed frames, said synchronizer being pivotally mounted to said mounting seats;
wherein said driving gear of said drive unit, said first synchronizer gear and said screw rod gear of said one of said lifting units are disposed in said mounting seat of the one of said lifting units, and said second synchronizer gear and said screw rod gear of the other one of said lifting units are disposed in said mounting seat of the other one of said lifting units;
wherein each of said lifting units further includes a shield plate corresponding to a respective one of said connecting walls and extending in both of said heating region and said transmission region, and a through groove formed through said shield plate and corresponding in position to said screw rod of said lifting unit; and
wherein, for each of said lifting units, said mounting seat and said screw rod are located between said shield plate and the respective one of said connecting walls, and said lift frame extends through said through groove to one side of said shield plate opposite to the respective one of said connecting walls.

2. The stove as claimed in claim 1, wherein:
said screw rod gears, said synchronizer gears, and said driving gear are all bevel gears.

3. The stove as claimed in claim 1, wherein:
said drive unit further has a driving handle disposed on one end of said drive shaft distal from said driving gear, said heating seat having a through hole, said drive shaft extending through said through hole to be connected to said driving handle.

4. The stove as claimed in claim 1, wherein:
said heating unit includes a plurality of gas pipes within said mounting space.

5. The stove as claimed in claim 1, further comprising a top cover pivotally connected to said top seat, and having a handle that is operable to move said top cover to open or close said mounting space.

6. The stove as claimed in claim 1, wherein each of said lifting units further includes a thrust bearing disposed between said screw rod and said mounting seat for facilitating rotation of said screw rod.

\* \* \* \* \*